(12) United States Patent
Clarke et al.

(10) Patent No.: US 7,698,946 B2
(45) Date of Patent: Apr. 20, 2010

(54) SYSTEM AND METHOD FOR ULTRASONIC DETECTION AND IMAGING

(75) Inventors: Burton Roland Clarke, Cuba, IL (US); Ryan Paul Allgaier, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1092 days.

(21) Appl. No.: 11/361,365

(22) Filed: Feb. 24, 2006

(65) Prior Publication Data
US 2007/0238993 A1  Oct. 11, 2007

(51) Int. Cl.
*G01N 29/00* (2006.01)
*A61B 8/00* (2006.01)

(52) U.S. Cl. ............................. 73/601; 73/618; 73/655; 600/437

(58) Field of Classification Search ................... 73/601, 73/606, 618; 600/437, 443, 447, 459
See application file for complete search history.

(56) References Cited

U.S. PATENT DOCUMENTS

| | | |
|---|---|---|
| 3,592,967 A | 7/1971 | Harris |
| 3,691,819 A | 9/1972 | Guest |
| 3,814,207 A | 6/1974 | Kusuda et al. |
| 4,066,095 A | 1/1978 | Massa |
| 4,083,229 A | 4/1978 | Anway |
| 4,201,092 A | 5/1980 | Dau |
| 4,416,145 A | 11/1983 | Goodman et al. |
| 4,713,798 A | 12/1987 | Kay |
| 4,809,538 A | 3/1989 | Fisch |
| 4,833,716 A | 5/1989 | Cote, Jr. |
| 4,852,390 A | 8/1989 | Fisch |
| 4,858,462 A | 8/1989 | Coulter et al. |
| 4,991,426 A | 2/1991 | Evans |
| 5,117,676 A | 6/1992 | Chang |
| 5,185,609 A | 2/1993 | DeBord |
| 5,231,866 A | 8/1993 | Peacock |
| 5,361,636 A | 11/1994 | Farstad et al. |
| 5,400,645 A | 3/1995 | Kunze et al. |
| 5,408,867 A | 4/1995 | Kunze et al. |

(Continued)

FOREIGN PATENT DOCUMENTS

WO   WO 00/55644   9/2000

OTHER PUBLICATIONS

Ultrasound Imaging and Tomograhy, http: www.me.berkeley.edu/mcl/usound.html, Ralh, Dec. 3, 1996.*

(Continued)

*Primary Examiner*—J M Saint Surin
(74) *Attorney, Agent, or Firm*—Finnegan, Henderson, Farabow, Garrett & Dunner

(57) ABSTRACT

Systems and Methods are disclosed for the detection and imaging of ultrasonic energy. Embodiments of the invention utilize an array of ultrasonic sensors where data from each of the sensors are processed by RMS-to-DC conversion. In addition, embodiments of the invention output a contour map based on detected ultrasonic energy and blend at least one feature of the contour map with a feature of a visible image so that a blended image can be displayed to an operator. Furthermore, embodiments of the invention provide a system and method for repositioning an array of ultrasonic sensors with respect to target area or Unit Under Test (UUT) to facilitate a thorough and repeatable test.

15 Claims, 13 Drawing Sheets

U.S. PATENT DOCUMENTS

| | | | |
|---|---|---|---|
| 5,416,724 | A | 5/1995 | Savic |
| 5,433,104 | A | 7/1995 | Kunze et al. |
| 5,475,613 | A | 12/1995 | Itoga et al. |
| 5,544,074 | A | 8/1996 | Suzuki et al. |
| 5,548,530 | A | 8/1996 | Baumoel |
| 5,557,969 | A | 9/1996 | Jordan |
| 5,650,943 | A | 7/1997 | Powell et al. |
| 5,790,690 | A | 8/1998 | Doi et al. |
| 5,865,751 | A * | 2/1999 | Okuno et al. ............... 600/443 |
| 5,925,821 | A | 7/1999 | Bousquet |
| 5,974,862 | A | 11/1999 | Lander et al. |
| 5,979,239 | A | 11/1999 | Youngquist et al. |
| 6,216,539 | B1 | 4/2001 | Johnson et al. |
| 6,220,098 | B1 | 4/2001 | Johnson et al. |
| 6,247,353 | B1 | 6/2001 | Battenberg et al. |
| 6,267,000 | B1 | 7/2001 | Harper et al. |
| 6,354,147 | B1 | 3/2002 | Gysling et al. |
| 6,367,328 | B1 | 4/2002 | Gorman et al. |
| 6,370,414 | B1 | 4/2002 | Robinson |
| 6,442,999 | B1 | 9/2002 | Baumoel |
| 6,453,247 | B1 | 9/2002 | Hunaidi |
| 6,595,059 | B2 | 7/2003 | Gorman et al. |
| 6,707,762 | B1 | 3/2004 | Goodman et al. |
| 6,725,878 | B1 | 4/2004 | Nawa et al. |
| 6,804,992 | B2 | 10/2004 | Goodman et al. |
| 6,971,576 | B2 | 12/2005 | Tsikos et al. |
| 6,973,344 | B2 | 12/2005 | Finneran et al. |
| 6,983,642 | B2 | 1/2006 | Stumpf |
| 7,058,190 | B1 * | 6/2006 | Zakarauskas et al. ....... 381/122 |
| 7,107,849 | B2 * | 9/2006 | Sugiyama et al. ............. 73/592 |
| 7,475,801 | B2 * | 1/2009 | Johansen et al. ............. 228/1.1 |
| 2003/0164044 | A1 | 9/2003 | Gayle |
| 2004/0035209 | A1 | 2/2004 | Sugiyama et al. |
| 2004/0122602 | A1 | 6/2004 | Nagase |
| 2005/0162261 | A1 | 7/2005 | Li |
| 2006/0219013 | A1 * | 10/2006 | Baba et al. .................... 73/618 |
| 2006/0254359 | A1 * | 11/2006 | Langlois et al. ............... 73/606 |
| 2007/0276250 | A1 * | 11/2007 | Donaldson .................. 600/459 |
| 2009/0082668 | A1 * | 3/2009 | Hamada et al. ............. 600/443 |
| 2009/0099451 | A1 * | 4/2009 | Nakaya et al. ............... 600/443 |

OTHER PUBLICATIONS

Tsung Nan Chou et al. "An integrated vision/ultrasonic sensor for 3D target recognition & measurement" vol. 1, pp. 189-193 ISBN: 0-85296-692-X.

\* cited by examiner

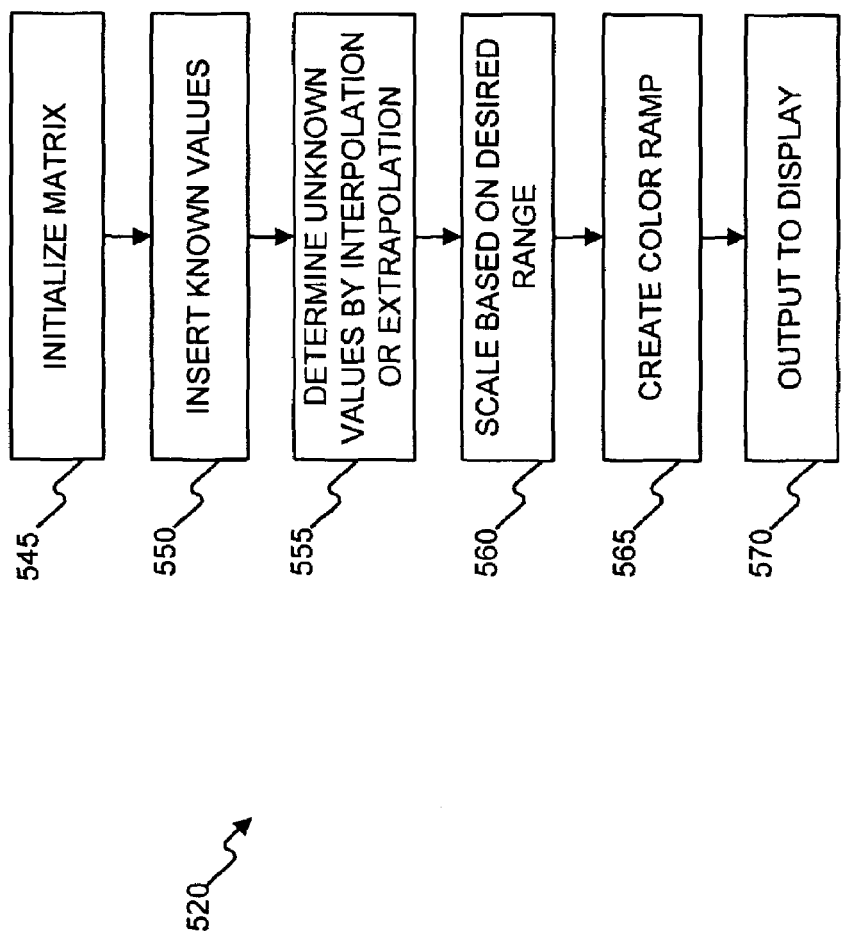

SYSTEM AND METHOD FOR ULTRASONIC DETECTION AND IMAGING

TECHNICAL FIELD

This disclosure relates generally to data processing systems and methods, and more particularly, but without limitation, to systems and methods related to detection, imaging, and/or other processing associated with ultrasonic energy.

BACKGROUND

A practical application for the detection and imaging of ultrasonic energy is to locate, by inference, ultrasonic energy sources. Such sources may be, for instance, a gas or fluid escaping from a pressurized container (in other words, a leak). Alternatively, ultrasonic energy may be caused by a mechanical vibration, such as that caused by an excessively-worn bearing or by missing teeth on a gear drive assembly.

Piezoelectric and other detectors are known for detecting ultrasonic energy emissions. Known systems and methods utilizing such detectors have many disadvantages, however. For instance, because of the signal frequencies involved, known systems may utilize very high-speed sampling rates that increase the expense of data acquisition hardware. Furthermore, known detection systems do not provide user-friendly outputs. For example, such systems may not support imaging at all. And known systems that do provide imaging of the ultrasonic energy may not sufficiently relate the detected source of ultrasonic energy to the surrounding environment in a way that allows for a targeted response to the detection event. Moreover, known detection systems and methods may be limited to a narrow Field-Of-View (FOV) without a structured way to fully screen a Unit Under Test (UUT) that occupies an area that is many times the size of the detector's FOV. Known hand-held detection systems and methods are exemplary of this latter problem, relying on an operator to wave the hand-held detection system with respect to the UUT in an effort to provide an effective screen.

What is needed are systems and methods for detecting ultrasonic energy that reduce the cost of data acquisition, provide more useful outputs to a test operator, and enable more complete and repeatable ultrasonic energy detection over a broad target area.

SUMMARY OF THE INVENTION

Embodiments of the invention seek to overcome one or more of the disadvantages described above. For example, embodiments of the invention utilize an array of ultrasonic sensors where data from each sensor in the array are processed by RMS-to-DC conversion. An advantage of this approach is that it may eliminate the need for high-speed analog-to-digital conversion (ADC) hardware as part of the data collection channel. In addition, embodiments of the invention output a contour map based on detected ultrasonic energy and blend at least one feature of the contour map with a feature of a visible or other image so that a blended image can be displayed to an operator. Such a system and method may be more intuitive and useful to a user than a system that merely outputs an image based upon the ultrasonic energy alone. Furthermore, embodiments of the invention provide a system and method for repositioning an array of ultrasonic sensors with respect to target area or Unit Under Test (UUT) to facilitate a thorough and repeatable test. As used herein, ultrasonic energy refers generally to vibrations in the ultrasonic frequency range, for example at frequencies greater than about 20 kHz.

Embodiments of the invention provide a system configured to detect ultrasonic energy including: an ultrasonic sensor array, the ultrasonic sensor array including a plurality of ultrasonic sensors; a processor operably coupled to the ultrasonic sensor array; and a visible image detector module operably coupled to the processor, the system configured to calculate a Root-Mean-Square (RMS) value associated with each of the plurality of ultrasonic sensors.

Embodiments of the invention provide a method for graphically displaying ultrasonic energy including: receiving data from each of a plurality of ultrasonic sensors, the data based on Root-Mean-Square (RMS) calculation; building a contour map based on the received data; receiving a camera image; and blending at least one feature of the contour map with at least one feature of the received camera image.

Embodiments of the invention provide a processor-readable medium having stored thereon instructions for a method of generating a graphical user interface (GUI), the method including: receiving data from each of a plurality of ultrasonic sensors, the data based on Root-Mean-Square (RMS) calculation; building a contour map based on the received data; receiving a visual camera image; blending at least one feature of the contour map with at least one feature associated with the received visual camera image to create a blended image; and displaying the blended image in a first portion of a display screen.

Embodiments of the invention provide a method for testing including: selecting a first view of a unit under test, the first view associated with a relative position between a first ultrasonic sensor array and the unit under test; selecting a first region, the first region being associated with a portion of the first view; calculating a contour map based on the first region; and recognizing at least one feature of the contour map.

The invention will now be described with respect to exemplary embodiments illustrated in the drawings and discussed in the detailed description.

BRIEF DESCRIPTION OF THE DRAWINGS

FIG. 5B is a flow diagram of a method for building a contour map, according to an embodiment of the invention;

DETAILED DESCRIPTION

Figure 1:
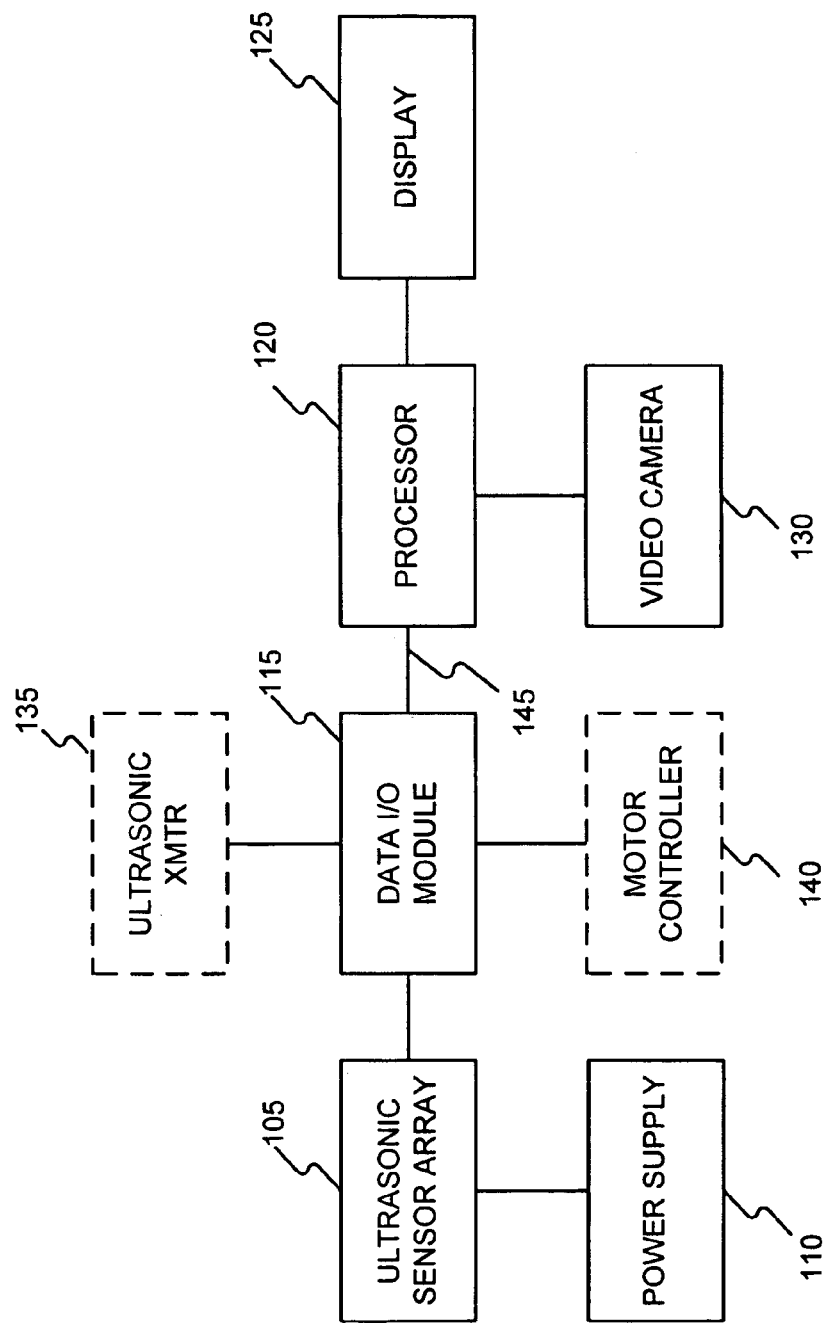
FIG. 1 is a block diagram of a functional architecture for an ultrasonic energy detection system, according to an embodiment of the invention.

FIG. 1 is a block diagram of a functional architecture for an ultrasonic energy detection system, according to an embodiment of the invention. In the illustrated embodiment, an ultrasonic sensor array 105 is coupled to the power supply 110 and a data I/O module 115. The data I/O module 115 is coupled to an ultrasonic transmitter 135, a motor controller 140, and a processor 120. The processor 120 may be or include a personal computer, microcomputer, microcontroller, or other processing element. Link 145 may be a Universal Serial Bus (USB) port, although other communication protocols may also be used. The processor 120 is coupled to video camera 130 and display 125. IOtech Personal Daq/50 Series USB Data Acquisition Modules are suitable hardware choices for the data I/O module 115. The architecture may further include memory (not shown) coupled to the processor 120, the memory being configured to store data and/or software that is executable by the processor 120.

Variations to the illustrated functional architecture are possible. For example, as indicated by dashed lines, the ultrasonic transmitter 135 and the motor controller 140 are optional. In addition, in some embodiments, the video camera 130 may be coupled to the data I/O module 115. Further, the video camera 130 could be adapted to capture still images ("snapshots") instead of, or in addition to, video images. Moreover, the functional architecture illustrated in FIG. 1 may further include a laser or other range finder (not shown) coupled to the processor 120. Further, the functional architecture may include multiple instances of any of the illustrated functional blocks. For instance, some embodiments may include multiple ultrasonic sensor arrays 105, multiple data I/O modules 115, multiple processors 120, and/or multiple motor controllers 140. The couplings between functional blocks illustrated in FIG. 1 may be accomplished with any suitable wired or wireless interconnection protocol, according to design choice.

In operation, the ultrasonic sensor array 105 detects ultrasonic energy in response to ultrasonic energy sources (not shown) from a target area or Unit Under Test (UUT). The ultrasonic sensor array 105 may include signal processing modules (not shown) powered by the power supply 110. Processed ultrasonic data is coupled from the ultrasonic sensor array 105 to the processor 120 via the data I/O module 115. Video Camera 130 may be positioned to have a similar view of the ultrasonic source (not shown) as the ultrasonic sensor array 105. The processor 120 may be configured to further process the data received from the ultrasonic sensor array 105 and/or the video camera 130. The processor 120 may be adapted to display data derived from the ultrasonic sensor array 105, the video camera 130, or some combination or combinations thereof via the display 125.

In embodiments lacking a natural ultrasonic source, the ultrasonic transmitter 135 may be applied. For example, to facilitate the detection of defects, such as cracks or holes in the UUT, the ultrasonic transmitter 135 may be positioned inside of, or behind, the UUT so that ultrasonic energy from the ultrasonic transmitter 135 passing through the defect is detected by the ultrasonic sensor array 105.

In some instances, it may be desirable to change a relative position between the UUT and the ultrasonic sensor array 105. In this respect, it may be advantageous to move the position of the UUT. In other embodiments, it may be advantageous to move the ultrasonic sensor array. To reposition either the UUT or the ultrasonic sensor array 105, the motor controller 140 may receive commands from the processor 120, for instance to drive a stepper motor associated with tooling in the test environment. Exemplary embodiments of such repositioning will be described in further detail with respect to FIGS. 9A, 9B, and 10.

Figure 2:
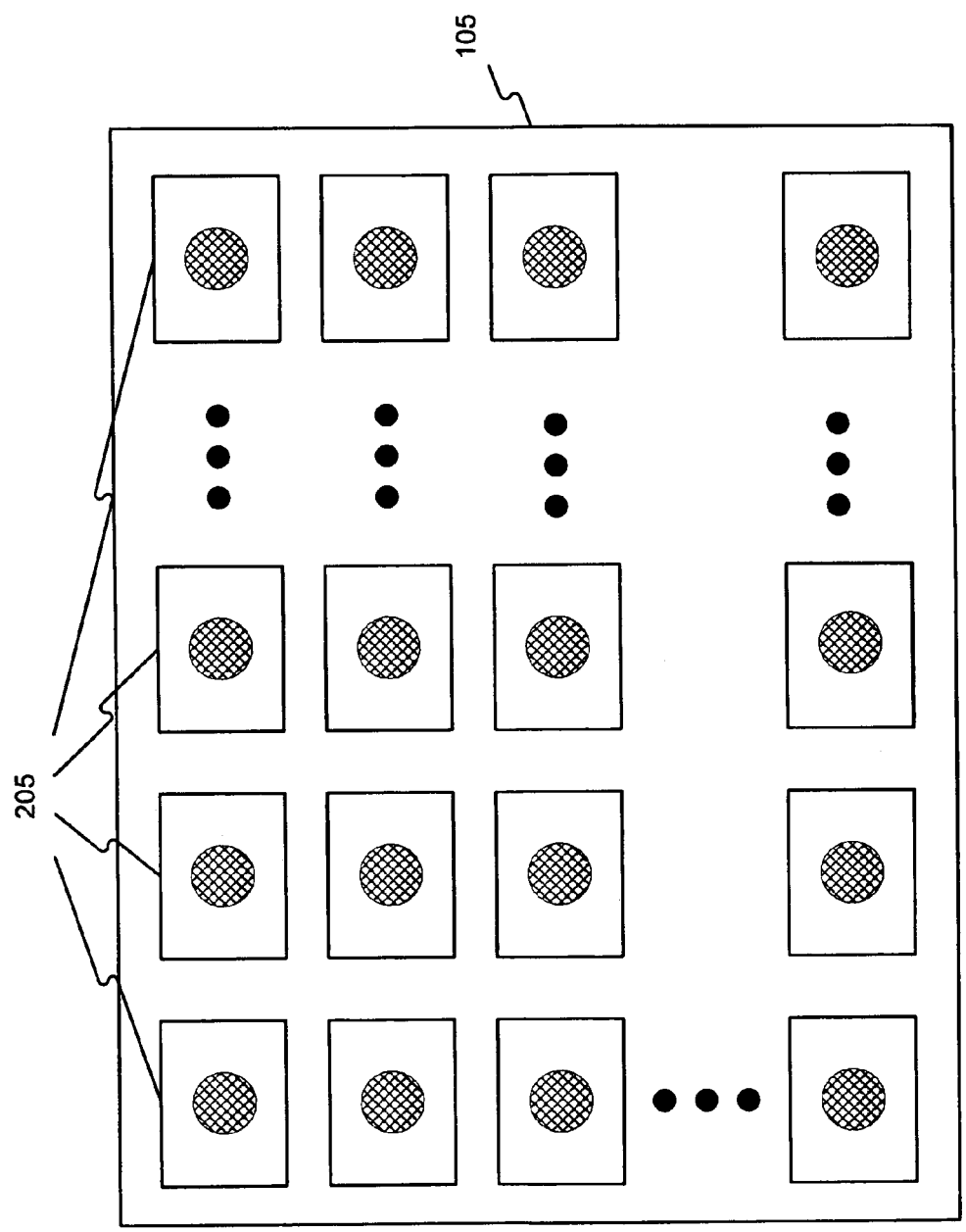
FIG. 2 is an illustration of the ultrasonic sensor array depicted in FIG. 1, according to an embodiment of the invention.

FIG. 2 is an illustration of the ultrasonic sensor array depicted in FIG. 1, according to an embodiment of the invention. In the illustrated embodiment, an ultrasonic sensor array 105 may be or include a two-dimensional rectangular array of ultrasonic sensor assemblies 205 arranged in n rows by m columns, where n and m are any positive integer, where each row includes the same number of sensor assemblies 205 as other rows and where each column includes the same number of sensor assemblies 205 as other columns. The ultrasonic sensor array 105 could include only a single row or a single column of sensor assemblies 205, thus forming a one-dimensional array.

The number of ultrasonic sensor assemblies 205, and relative positioning with respect to each other, may be varied according to design choice. For example, in an alternative embodiment, a circular pattern or other two or three dimensional arrangement of sensor assemblies 205 could be utilized.

In alternative embodiments, one or more sensor assemblies 205 in the ultrasonic sensor array 105 are sensitive to energy at other than ultrasonic frequencies.

Figure 3:
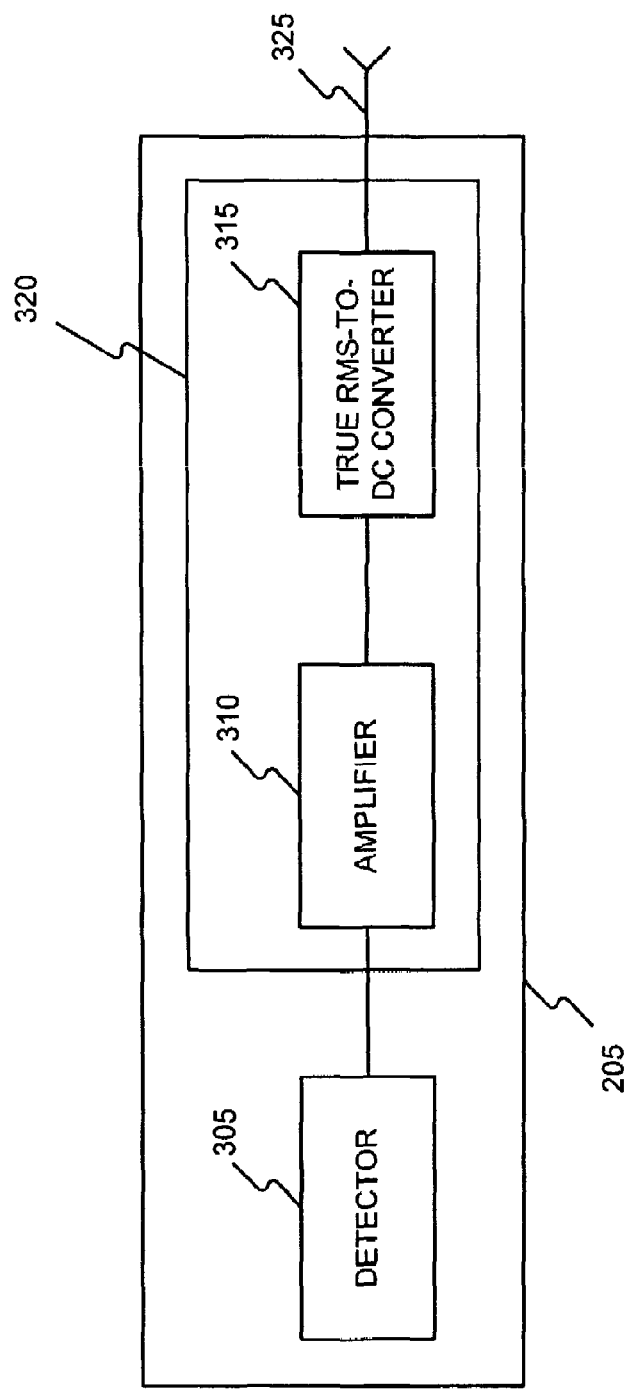
FIG. 3 is a block diagram of a functional architecture for the ultrasonic sensor assembly 205, according to an embodiment of the invention.

FIG. 3 is a block diagram of a functional architecture for the ultrasonic sensor assembly 205, according to an embodiment of the invention. In the illustrated embodiment, the ultrasonic sensor assembly 205 includes a detector 305 coupled to a Circuit Card Assembly (CCA) 320. The detector 305 may be sensitive to a particular range of ultrasonic energy, for example a frequency range of approximately 38 to 42 KHz, and may be a piezoelectric device. The detector 305 could also be sensitive to a broader frequency range, and filters (not shown) could optionally be applied to detect ultrasonic energy over a narrower frequency range.

The CCA 320 may include an amplifier 310 coupled to a true RMS-to-DC converter 315. The output 325 of the true RMS-to-DC converter 315 may be coupled to the processor 120 via the data I/O module 115.

In operation, the detector 305 detects ultrasonic energy, providing an analog signal (a varying voltage) to the amplifier 310. The amplifier 310 amplifies the analog signal from the detector 305 and provides the amplified signal to the true RMS-to-DC converter 315.

Roughly stated, Root Mean Square (RMS) transformation ("transformation" being used interchangeably herein with "conversion" or "calculation") produces a Direct Current (DC) equivalent of an Alternating Current (AC) voltage. True RMS-to-DC conversion is a statistical measure (the quadratic mean) of the magnitude of a varying quantity. For N measured voltages (v1, v2, ... vN), the true RMS voltage ($v_{RMS}$) is given by:

$$v_{RMS} = \text{SQRT}(1/N(v1^2 + v2^2 + \ldots + vN^2)).$$

In practical application, the N measurements must be taken rapidly enough (as compared to the frequency of the signal) and over a meaningful window of time.

In alternative embodiments, approximations of the true RMS may be used. For example, a common approximation of the RMS value for a sinusoidal signal is:

$$v_{RMS} = (0.707)(vpeak), \text{ where } vpeak = \text{the peak voltage of an AC signal.}$$

Other RMS approximations, such as the arithmetic mean or arithmetic median of the N measurements could also be used, although such approximated RMS-to-DC transformations would likely lead to less accurate results than the true RMS-to-DC conversion described above.

Preferably, RMS-to-DC conversions are performed for signals associated with each of the ultrasonic sensor assemblies over the same time interval. An output 325 associated with each of the ultrasonic sensor assemblies 205 provides a DC equivalent voltage to the data I/O module 115. Analog Devices AD536A is a suitable true RMS-to-DC converter.

Other embodiments of the CCA 320 may include multiple amplifier stages. For example, the amplifier 320 may include a front-end preamplifier (not shown) and a variable-gain amplifier (not shown). One or more National Semiconductor LM386 low-voltage power amplifiers are suitable for the amplifier 310.

CCA 320 may include additional signal conditioning devices according to design choice. Furthermore, the system could be partitioned so that the true RMS-to-DC converter 315 and/or the amplifier 310 is included with the data I/O module 115 instead of the ultrasonic sensor assemblies 205.

Figure 4:
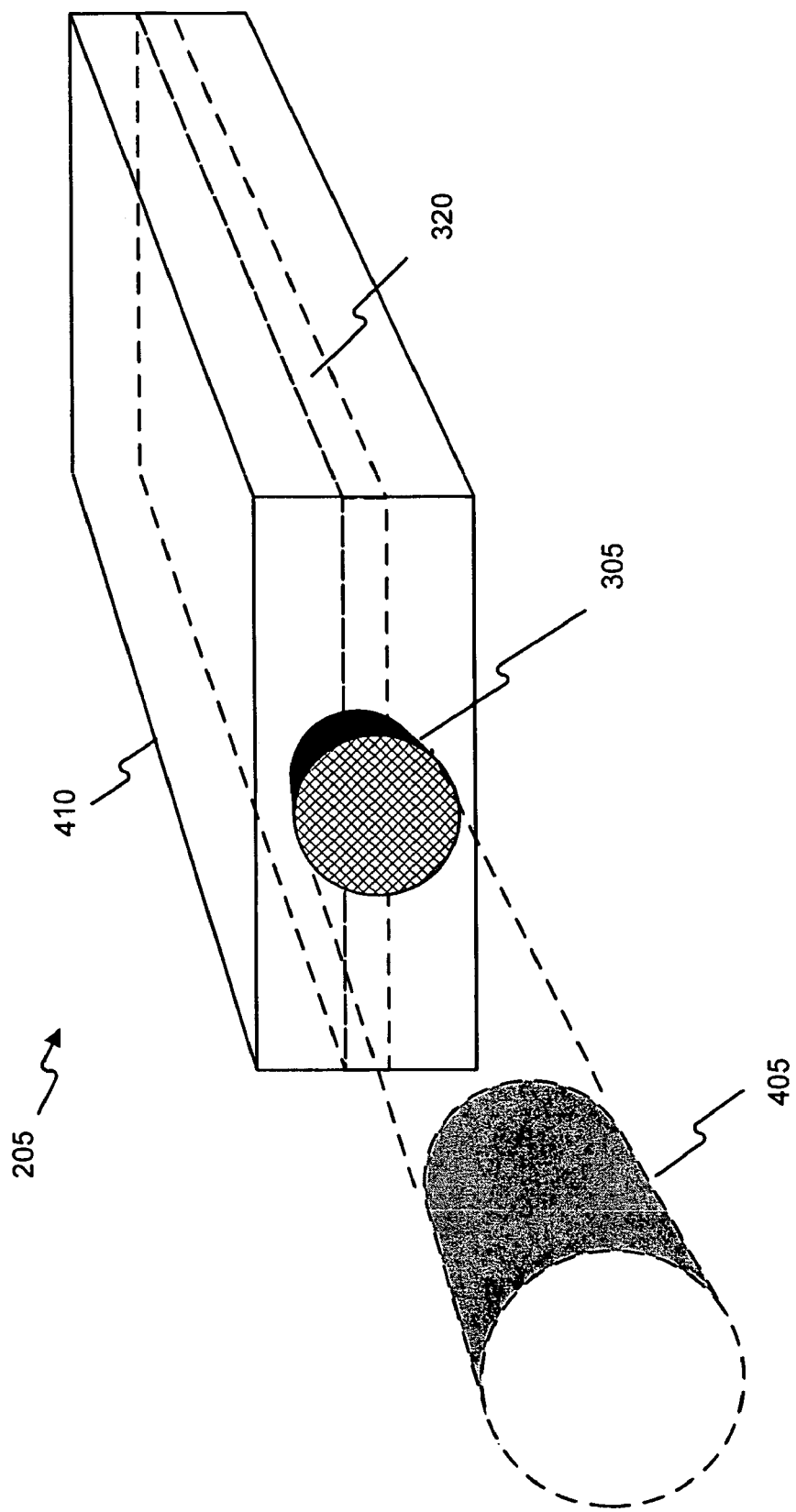
FIG. 4 is a perspective drawing of the ultrasonic sensor assembly 205, according to an embodiment of the invention.

FIG. 4 is a perspective drawing of the ultrasonic sensor assembly 205, according to an embodiment of the invention. In the illustrated embodiment, the ultrasonic sensor assembly 205 includes a cylindrical shroud 405 to encase the detector 305. The detector 305 and shroud 405 may be affixed to a chassis 410, and CCA 320 may be mounted inside the chassis 410 and electronically coupled to the detector 305.

Other form factors for the shroud 405, chassis 410, and CCA 320 are possible. For example, the shroud 405 may be of a hyperbolic, conical, hemispherical, or other shape that would facilitate focusing, filtering, or other conditioning of ultrasonic signals received by the detector 305. The use of a shroud 405 is optional.

In an alternative embodiment, a single cylindrical, hyperbolic, conical, hemispherical, or other shroud (not shown) is adapted to focus, filter, or otherwise condition ultrasonic energy with respect to the entire ultrasonic sensor array 105 rather than being present on each of the ultrasonic sensor assemblies 205.

Figure 5A:
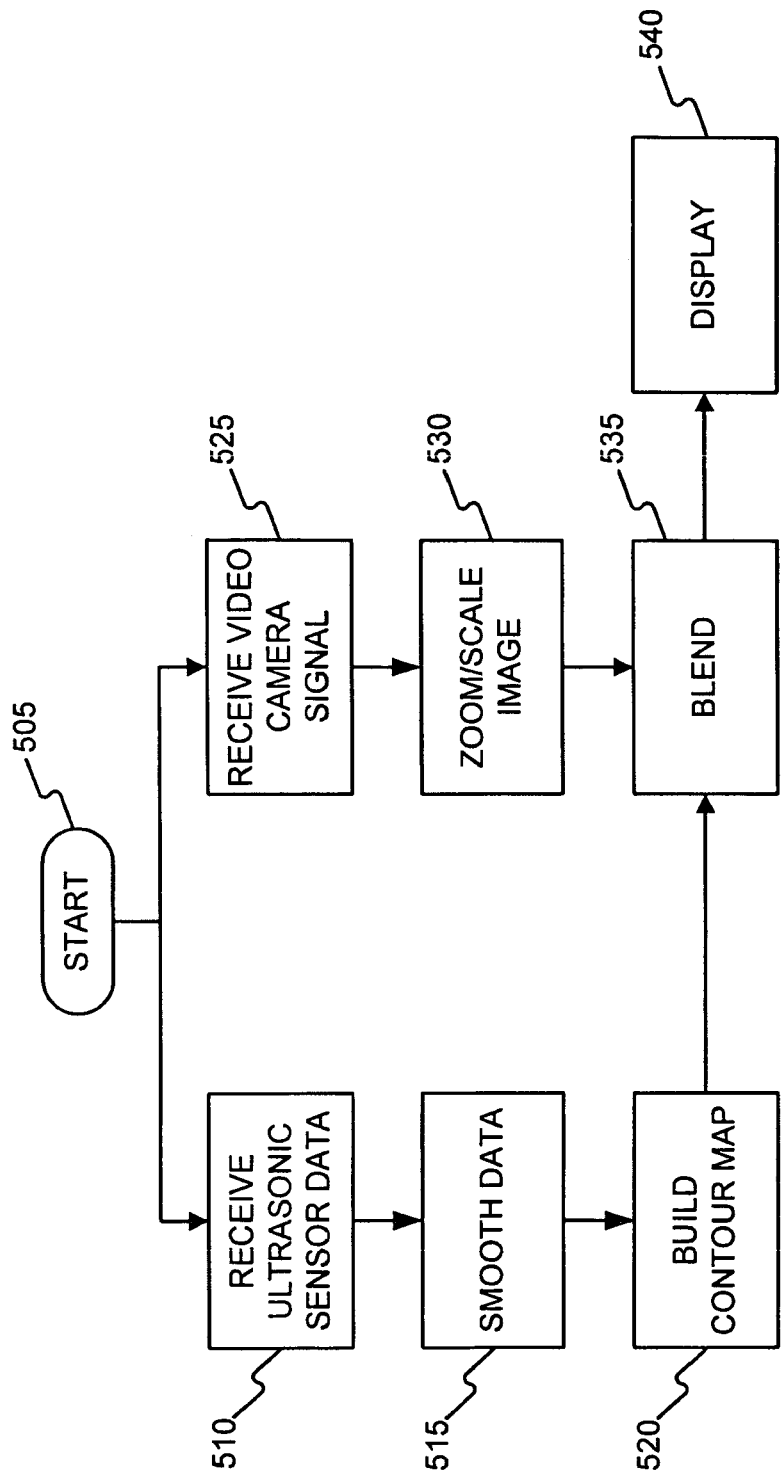
FIG. 5A is a flow diagram for a graphical display method, according to an embodiment of the invention.

FIG. 5A is a flow diagram for a graphical display method, according to an embodiment of the invention. In the illustrated embodiment, after initialization step 505, the process advances to step 510 to receive the ultrasonic sensor data, and also to step 525 to receive a video camera signal. As described with reference to FIG. 3 above, the ultrasonic sensor data may be based on a true RMS-to-DC conversion of the signal output by the ultrasonic detector 305 or an approximation thereof.

After receiving the ultrasonic sensor data in step 510, the process advances to step 515 to smooth data. The purpose of smoothing step 515 is to reduce the effect of transient noise in the detection frequency range. In one embodiment, smoothing step 515 is performed via a simple moving average calculation on the received data values. For example, smoothing step 515 may add the five most recent data values, then divide by five. Alternatively, a low-pass filter (LPF) (not shown), which may be implemented in hardware or software, could be utilized to perform smoothing step 515.

Next, the process advances to step 520 to build a contour map. An embodiment of step 520 is described below with reference to FIG. 5B.

Meanwhile, subsequent to receiving the video camera signal in step 525, the process advances to step 530 to zoom or scale (zoom/scale) an image associated with the video camera. The purpose of zooming/scaling step 530 is to scale the Field Of View (FOV) of the video camera to the contour map so that corresponding pixel locations on the video camera image and the contour map relate to the same physical locations of the UUT. The FOV of the video camera may be adjusted optically or via software. In addition, zooming/scaling step 530 may be performed manually or automatically. In automatic operation, step 530 may be informed of the distance between the video camera and the UUT by a ultrasonic range-finder, a laser range-finder, or other range-finder. A transfer function may then be used to convert the distance data to a video camera zoom value.

In step 535, the process blends data output from steps 520 and 530. For example, one or more features of the contour map resulting from step 520 may be overlaid with one or more features of the scaled image resulting from step 530. An example of such a blended image is provided in the blended display window 615 of FIG. 6. Finally, in step 540, the blended image may be displayed. In sum, FIG. 5A illustrates that ultrasonic data and video data may be separately processed before at least one feature of the processed ultrasonic data and the processed video data are blended. An advantage of a producing a blended image is that the source of the ultrasonic energy is spatially located with respect to the broader context of a target test area or UUT.

Variations to the process illustrated in FIG. 5A are possible. For example, instead of or in addition to receiving a video camera signal in step 525, the process could receive a signal from an infrared (IR) camera (not shown) or other detector (not shown). In addition, in some embodiments, it may not be necessary to adjust the zoom in step 530 (for example where the sensor array and video camera are always at a fixed distance from the UUT). Moreover, smoothing data step 515 may be omitted according to application demands.

FIG. 5B is a flow diagram of a method for building a contour map, according to an embodiment of the invention. The illustrated process is an embodiment of building a contour map step 520 that is shown in FIG. 5A. In the illustrated embodiment, the process begins by initializing a two-dimensional (2D) matrix in step 545. Step 545 is informed by a desired resolution that translates to a first value (representing a number of x positions) and a second value (representing a number of y positions) in the matrix.

Next, in step 550, known data (z values) associated with the true RMS-to-DC conversion (or approximation thereof) from each sensor assembly are associated with corresponding positions on the initialized 2D matrix. Then, in step 555, the process determines unknown values, for example by mathematical interpolation or extrapolation, which are also added to the initialized matrix. Interpolation/extrapolation step 555 can take into account the fact that the FOV of individual sensor assemblies may overlap at the UUT. Next, in step 560, the matrix is scaled based on a desired range of data in each dimension of the three dimensional matrix. For example, the scaling may be set for one or more of the x, y, and z axes.

In step 565, a color ramp is created for data ranges of the z axis in the matrix. For instance, where the z-axis scale varies from 0.0 to 1.0, a color ramp may specify that values between 0.0 and 0.7 are blue, values at 0.8 and 0.9 are yellow and orange, respectively, and values at 1.0 are red. In step 570, the matrix may be colored according to the color ramp created in step 565 and then output to a display in step 570.

Variations to the illustrated process are possible. For example, in some embodiments, the determining unknown values step 555 may be omitted where resolution requirements do not require additional matrix data values. Scaling step 560 may likewise be omitted if not required by the application. Moreover, in some embodiments, pre-existing color ramps may be used, eliminating the need to create a color map in step 565.

Figure 6:
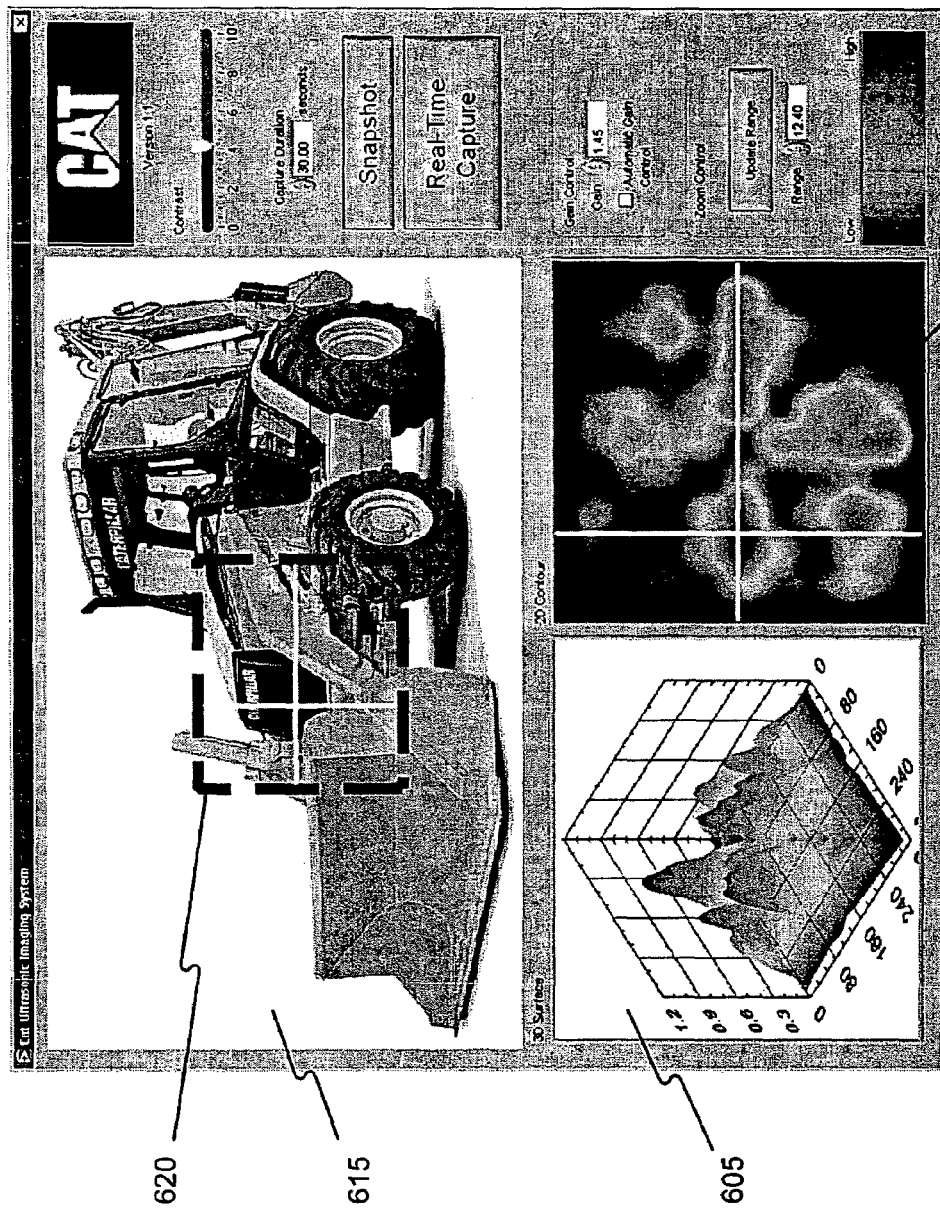
FIG. 6 is an illustration of a graphical user interface (GUI), according to an embodiment of the invention.

FIG. 6 is an illustration of a graphical user interface (GUI), according to an embodiment of the invention. In the illustrated embodiment, a contour map window 605 illustrates relative intensity of detected ultrasonic energy, peak intensity window 610 displays a peak intensity location on a plan view of the contour map, and a blended display window 615 includes a feature of the contour map (in this case, cross-hairs 620 associated with peak ultrasonic intensity) overlaid onto a color or gray-scale image from the video camera 130.

In an alternative embodiment (not shown) a blended window could include a blended image that includes a complete contour map (optionally at least partially transparent) overlaid onto a video camera image. Other blended variants are also possible.

Figure 7:
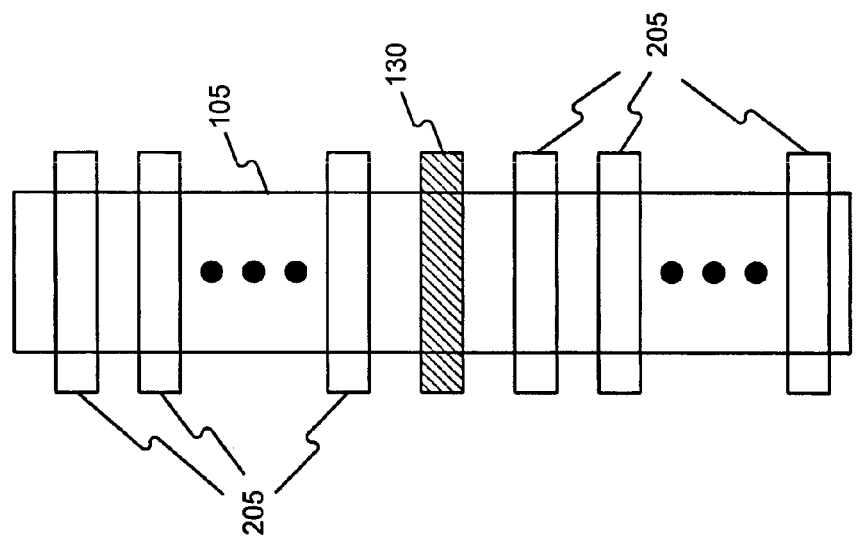
FIG. 7 is an illustration of an ultrasonic sensor array positioned with respect to a Unit Under Test (UUT), according to an embodiment of the invention.
Figure 7:
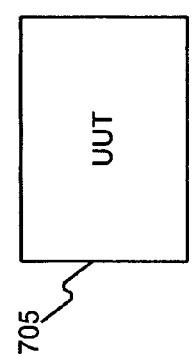

FIG. 7 is an illustration of an ultrasonic sensor array positioned with respect to a Unit Under Test (UUT), according to an embodiment of the invention. As illustrated therein, an ultrasonic sensor array 105, shown in a profile view, includes multiple ultrasonic sensor assemblies 205 and may also include the video camera 130 positioned on the ultrasonic sensor array 105. The advantage of co-locating the video camera 130 on the ultrasonic sensor array 105 is to provide similar perspective in the sensor array 105 and the video camera 130 with respect to the UUT 705. Each of the sensor assemblies 205 may have a FOV of, for example, twelve (12) degrees. Accordingly, the fields of view of two or more sensor assemblies 205 may overlap at the UUT 705.

In embodiments of the invention, a laser or other range finder (not shown) may also be mounted to the sensor array 105 to measure a distance to the UUT 705. Resulting distance information may be used, for example, to facilitate focusing the video camera 130 or performing zooming/scaling step 530 as discussed with reference to FIG. 5A.

The systems and methods described above with reference to FIGS. 1-7 may be used together with any of the test environments discussed below with respect to FIGS. 8A, 8B, 9A, 9B, or 10.

Figure 8B:
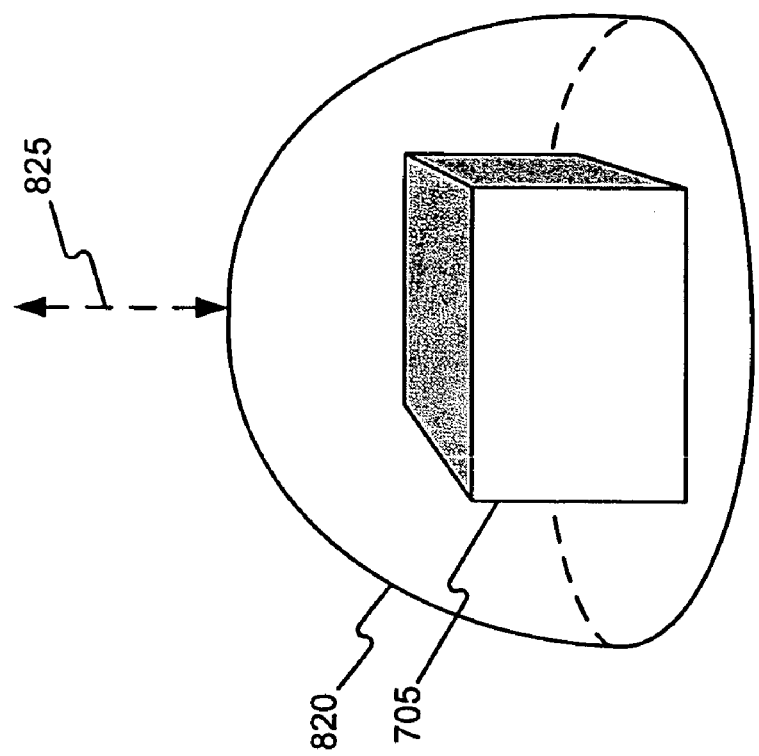
FIG. 8B is an illustration of a test environment, according to a second embodiment of the invention.
Figure 8A:
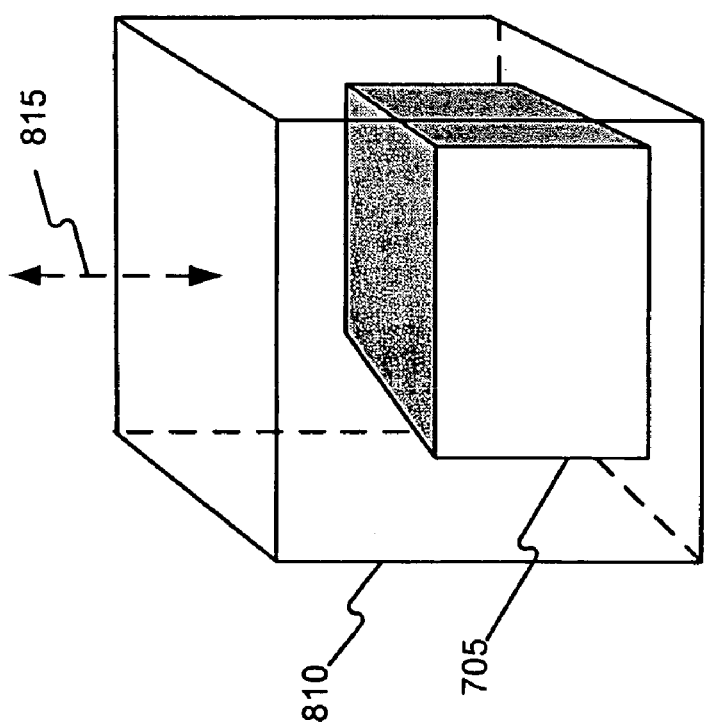
FIG. 8A is an illustration of a test environment, according to a first embodiment of the invention.

FIG. 8A is an illustration of a test environment, according to a first embodiment of the invention. As shown therein, a hollow cubic cover 810 having one open end may be raised or lowered in a vertical direction 815 over a UUT 705 to enclose the UUT 705 during test. One or more ultrasonic sensor arrays 105 may be attached to one or more interior surfaces of the cubic cover 810. Accordingly, the UUT 705 can be inspected from one or more perspectives during a test procedure. Moreover, a benefit of the cubic cover 810 is that it shields background noise, thereby improving signal-to-noise ratio (SNR) at the one or more ultrasonic sensor arrays 105.

FIG. 8B is an illustration of a test environment, according to a second embodiment of the invention. As shown therein, a hemispherical cover 820 may be positioned over the UUT 705 along a vertical axis 815. An inner surface of the hemispherical cover 820 may include one or more ultrasonic sensor arrays 105. Like cubic cover 810, the hemispherical cover 820 shields the UUT 705 from background noise during test, thereby improving signal-to-noise ratio (SNR) at the one or more ultrasonic sensor arrays 105.

As described above with reference to FIGS. 8A and 8B, a test environment may utilize more than one ultrasonic sensor array 105. Systems utilizing multiple sensor arrays 105 may be configured to switch between one or more of the multiple sensor arrays 105 during test. Moreover, where multiple sensor arrays 105 are implemented, one or more of the sensor arrays 105 could be sensitive to energy outside of the ultrasonic frequency range.

In embodiments of the invention, it may be advantageous to change the position of the UUT 705 with respect to the ultrasonic sensor array 105. Exemplary material handling devices for accomplishing this are illustrated in FIGS. 9A, 9B, and 10.

Figure 9B:
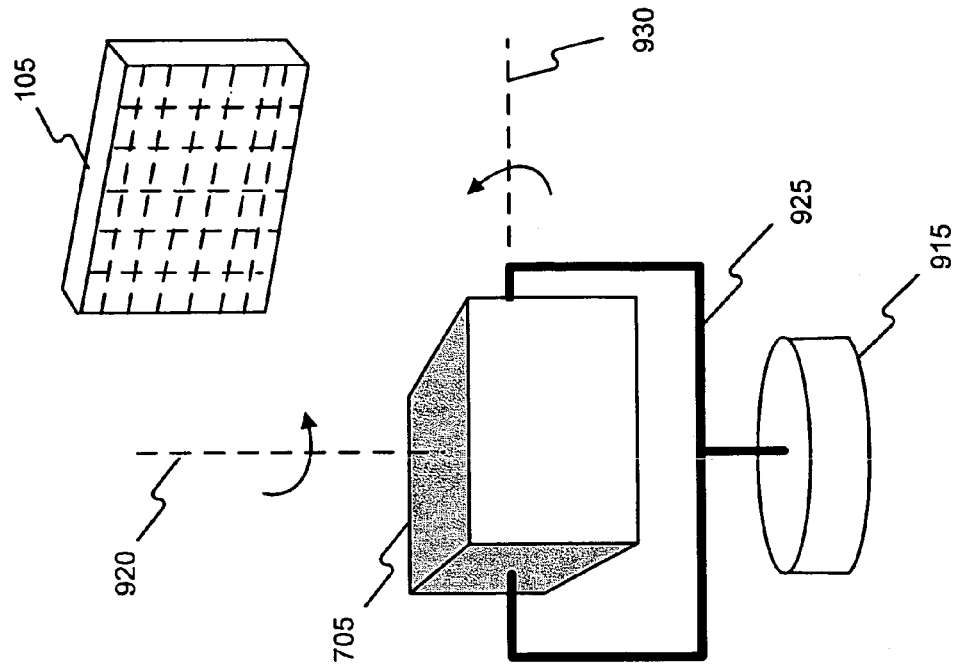
FIG. 9B is an illustration of a test environment, according to a fourth embodiment of the invention.
Figure 9A:
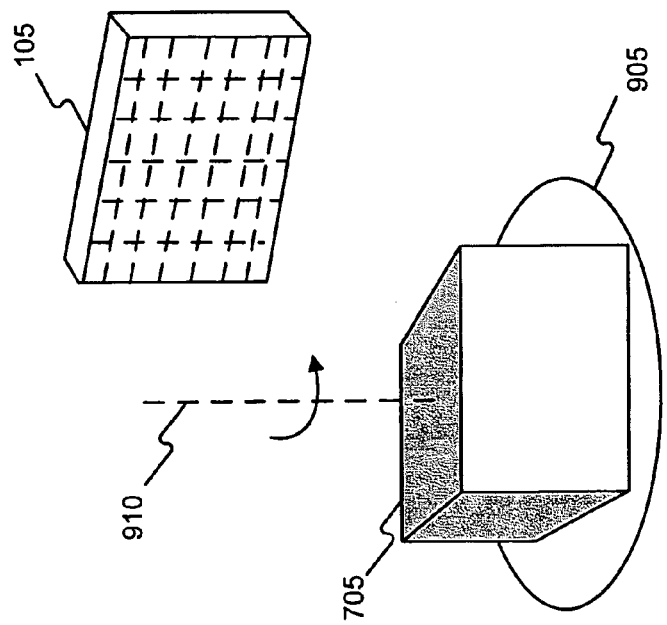
FIG. 9A is an illustration of a test environment, according to a third embodiment of the invention.

FIG. 9A is an illustration of a test environment, according to a third embodiment of the invention. As illustrated therein, a UUT 705 may be rotated about a vertical axis 910 using a carousel 905. Carousel 905 may be driven by a stepper motor (not shown), which may be controlled by motor controller 140. The benefit of such repositioning is that different views of the UUT 705 may be presented to the fixed sensor array 705. Moreover, such changing views are under precise and repeatable control.

FIG. 9B is an illustration of a test environment, according to a fourth embodiment of the invention. As shown therein, a UUT 705 is coupled to a gimbal mount 925 having a base 915. The gimbal mount 925 facilitates the positioning of the UUT about a vertical axis 920 and a horizontal axis 930 to change the position of the UUT 705 with respect to a stationary ultrasonic sensor array 105. The gimbal mount 925 may be under the control of the motor controller 140.

Figure 10:
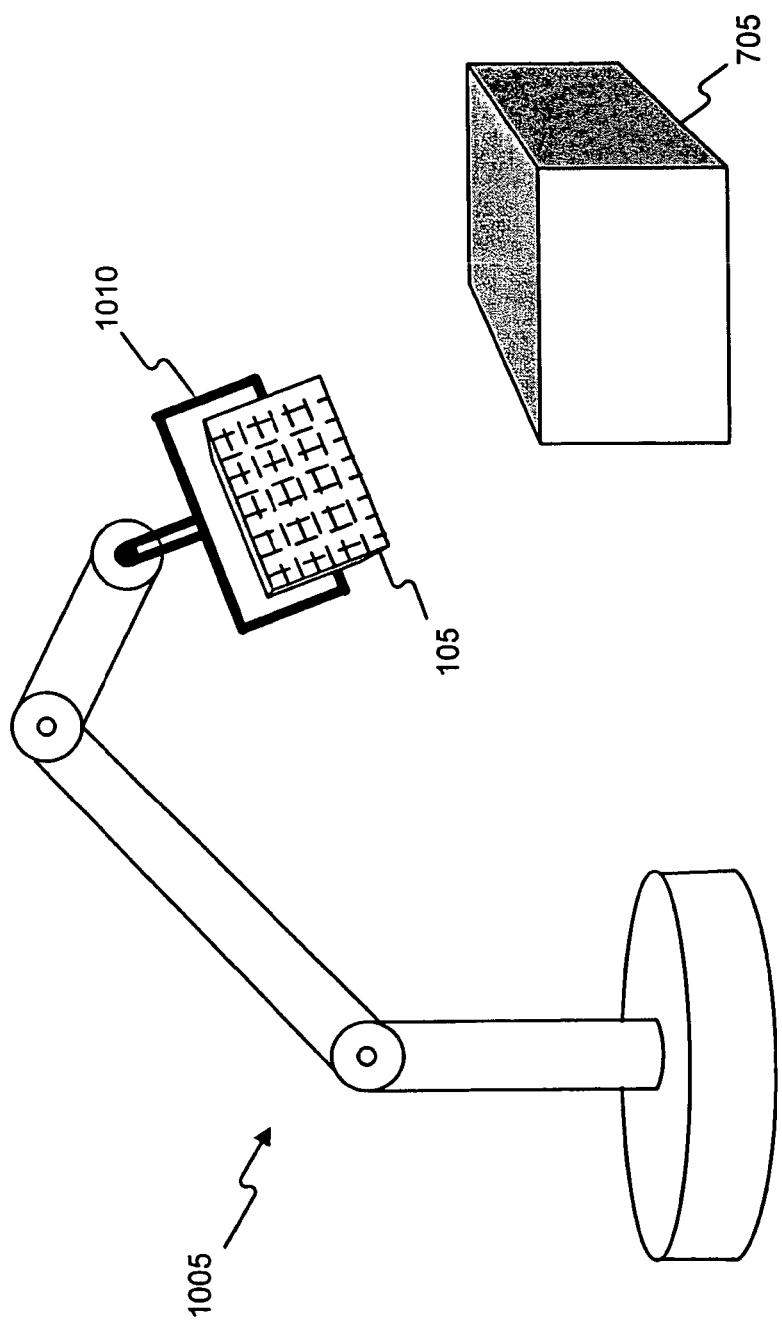
FIG. 10 is an illustration of a test environment, according to a fifth embodiment of the invention.

FIG. 10 is an illustration of a test environment, according to a fifth embodiment of the invention. As illustrated, an articulated arm 1005 may include end effector 1010 adapted to position the ultrasonic sensor array 105 with respect to the UUT 705. For example, the articulated arm 1005 may allow for six (6) degree freedom of motion (x, y, z, roll, pitch, yaw) in changing the position of the ultrasonic sensor array 105 with respect to the UUT 705. Either of the embodiments illustrated in FIG. 9A or 9B may be used in combination with the embodiment shown in FIG. 10. In addition, a conveyor system may be used as a material handling device to change the relative position of a UUT with respect to one or more ultrasonic sensor arrays 105 in the alternative or in combination with any of the embodiments described with reference to FIGS. 9A, 9B, or 10 above.

The methods discussed next with reference to FIGS. 11A and 11B can be used separately or together to enable a test environment.

Figure 11A:
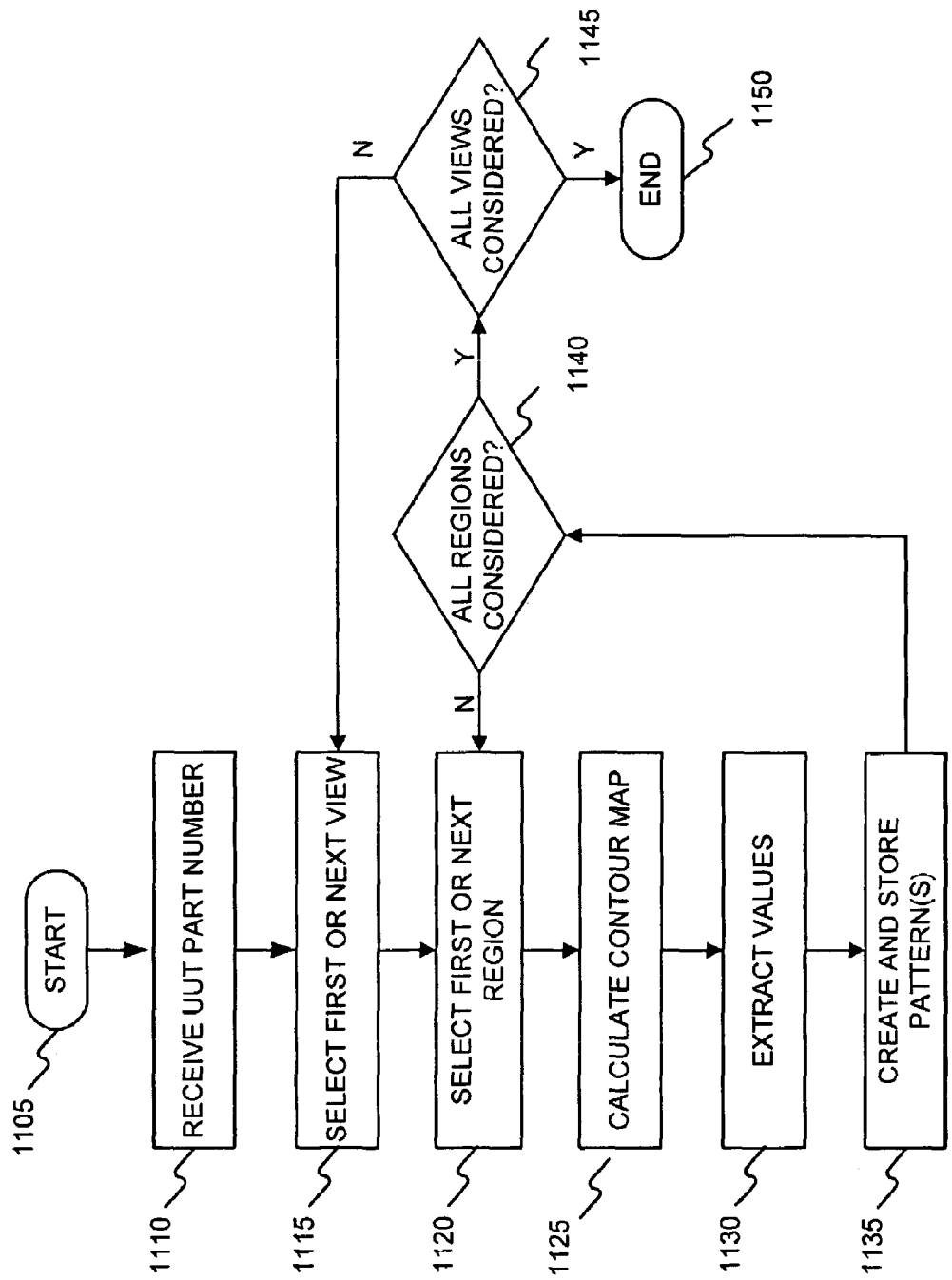
FIG. 11A is a flow diagram of a pattern generation method, according to an embodiment of the invention.

FIG. 11A is a flow diagram of a pattern generation method, according to an embodiment of the invention. After initialization step 1105, the process receives a UUT part number in step 1110. The UUT part number may be received in step 1110 based on manual input from an operator. In other embodiments, step 1110 may be based on automated input, for example a bar code scan, optical character recognition (OCR) scan, or other automated input.

Next, the process selects a first view (for example a predetermined plan or perspective view of the UUT) in step 1115, then selects a first region (portion of the view) in step 1120. The process then calculates at least one contour map in step 1125, for example using the process described above with reference to FIG. 5B. In step 1130, the process extracts values from the one or more contour maps. In embodiments of the invention, step 1130 may include manipulation of the extracted values, for instance selection of peak values or calculation of average values from the one or more contour maps. Patterns are created and stored in step 1135 based on the values extracted in step 1130. In conditional step 1140 the process determines whether all predetermined regions have been considered.

Where the result of conditional step 1140 is in the affirmative, the process advances to conditional step 1145 to determine whether all predetermined views have been considered. Where the result of conditional step 1140 is in the negative, the process selects a next region in step 1120.

Where the result of conditional step 1145 is in the negative, the process selects a next predetermined view in step 1115. Where the result of conditional step 1145 is in the affirmative, the process terminates in step 1150. Upon completion of the process illustrated in FIG. 11A, one or more patterns have been created for a particular UUT part number. The pattern generation process described above could be repeated for one or more known good units and/or for one or more known defective units.

Variations to the process illustrated in FIG. 11A are possible. For example, some applications may only review a single view or only a single region within any one or more views. In addition, in alternative embodiments, calculation step 1125 may be eliminated where, for example, extraction step 1130 is based on a bit map image from the video camera. Data from other sensors, such as digital thermometers and/or digital hygrometers may also be used in extraction step 1130. In addition, human intelligence can be added to the patterns generated by the process in FIG. 11A. For example, different portions of the patterns can be associated with part descriptors. Moreover, known "leaky" regions, such as portions of the UUT that utilize temporary plugs during assembly and test operations, can inform one or more patterns of the UUT created in step 1135.

Figure 11B:
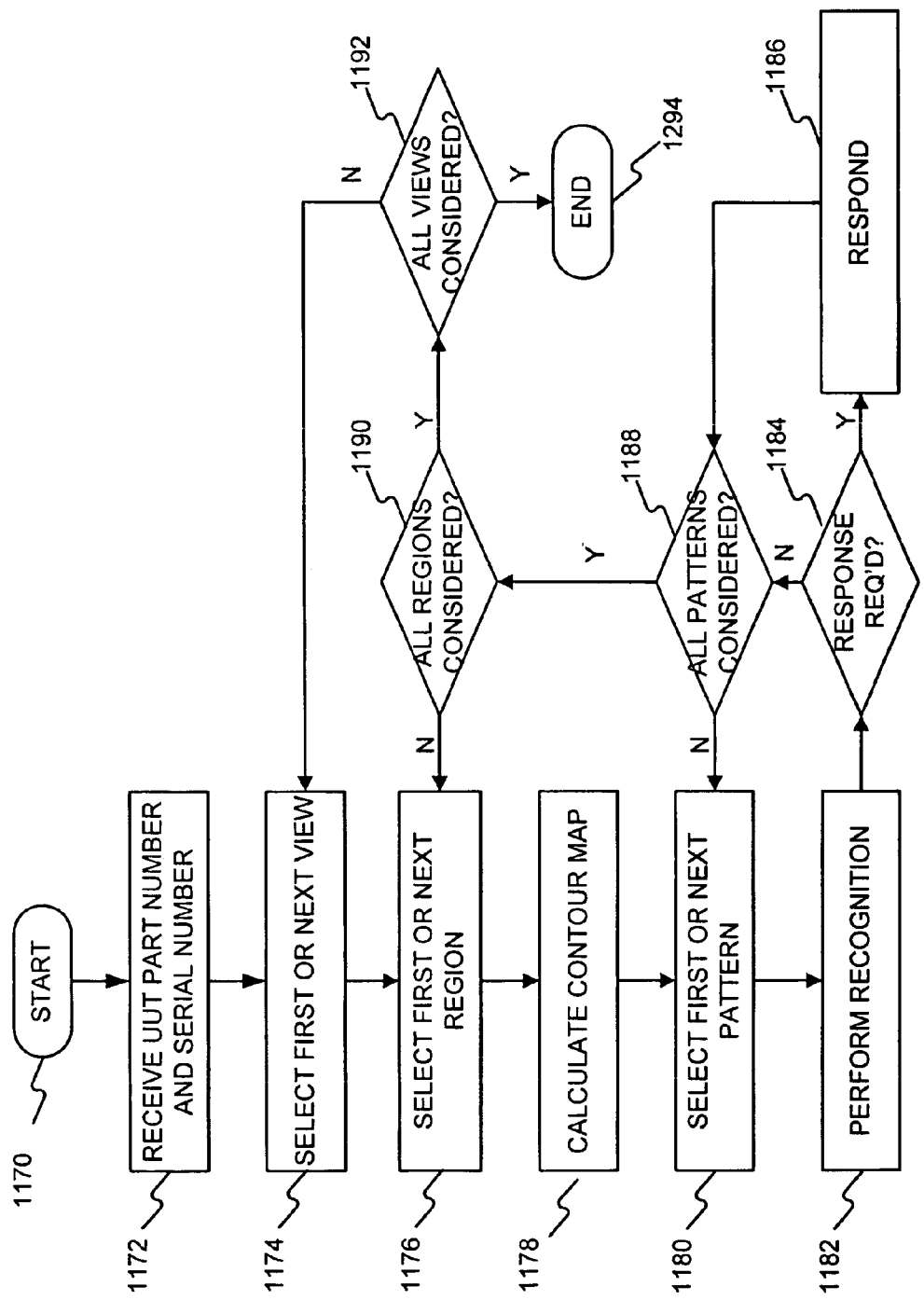
FIG. 11B is a flow diagram of a testing method, according to an embodiment of the invention.

FIG. 11B is a flow diagram of a testing method, according to an embodiment of the invention. After initialization step 1170, the process receives a UUT part number in step 1172. The UUT part number may be received in step 1172 based on manual input from an operator. In other embodiments, step 1172 may be based on automated input, for example a bar code scan, optical character recognition (OCR) scan, pattern recognition, or other automated process.

Next, the process selects a first view (for example a predetermined plan or perspective view of the UUT part number) in step 1174, then selects a first region (portion of the view) in step 1176. Views and regions selected in steps 1172 and 1174 correspond to views and regions selected in steps 1115 and 1120, respectively. The process then calculates at least one contour map in step 1178, for example using the process described above with reference to FIG. 5B.

Then, in step 1180, the process selects a first pattern (including reading the first pattern from memory) and performs a recognition task in step 1182. Recognition task 1182 may be or include artificial intelligence and/or neural network approaches for analyzing data derived from sensors. Such data may be analyzed on its own (in which case selection step 1180 is not needed), or by comparison to one or more stored patterns. In a simple form, recognition step 1182 may simply compare one or more peak measured values to a predetermined threshold value. The result of recognition step 1182 may be or include, for example, the identification of a leak, the precise location of a leak (by coordinates or with reference to a descriptive feature), an assessment of the flow rate and/or direction of a leak, and/or an estimate of the size of a hole in a pressurized UUT.

The process then advances to conditional step 1184 to determine whether a response is required. Where the result of conditional step 1184 is in the affirmative, the process advances to response step 1186, which may include, for example, logging or saving the results of recognition step 1182 by UUT part number and serial number, notifying an operator, and/or facilitating indicated rework or repair operations (not shown). Subsequent to step 1186, and where the result of conditional step 1184 is in the negative, the process is promoted to conditional step 1188 to determine whether all relevant patterns have been considered.

Where the result of conditional step 1188 is in the negative, the process selects a next pattern in step 1180. Where the result of conditional step 1188 is in the affirmative, the process advances to conditional step 1190 to determine whether all regions have been considered. Where the result of conditional step 1190 is in the negative, the process selects a next region in step 1176. Where the result of conditional step 1190 is in the affirmative, the process advances to conditional step 1192 to determine whether all views have been considered. Where the result of conditional step 1192 is in the negative, the process selects a next predetermined view in step 1174. Where the result of conditional step 1192 is in the affirmative, the process terminates in step 1294.

Variations to the process illustrated in FIG. 11B are possible. For example, some applications may only review a single view or only a single region within any one or more views. In addition, in alternative embodiments, recognition step 1182 may be further informed by primitive image or other comparisons to one or more stored bit map images. Alternatively, or in combination, recognition step 1182 may be based on a combination of more than one pattern, more than one region, and/or more than one view.

The system described with reference to FIGS. 1-4 may be configured to perform one or more of the methods described with reference to FIGS. 5A, 5B, 11A, and 11B. In addition, any one of the methods described with reference to FIGS. 5A, 5B, 11A, and 11B may be performed in hardware, software, or a combination of hardware and software. Moreover, the methods described with reference to FIGS. 5A, 5B, 11A, and 11B, or any portion thereof, may be implemented by instructions that are stored on computer-readable medium so that the instructions can be read and executed by the processor 120.

INDUSTRIAL APPLICABILITY

The disclosed systems and method may be applicable to a wide variety of applications where it may be advantageous to detect, display or otherwise process data associated with ultrasonic energy. As described above, an ultrasonic signature may be associated with certain types of defects. Moreover, an ultrasonic source may be used in a testing or diagnostic mode to uncover certain holes, cracks, voids, or other defects indicated by mechanical vibrations of mechanical components or systems in the ultrasonic frequency range.

Accordingly, the systems and/or methods described herein may be applicable for testing or diagnostics associated with, for instance: cylinders, transmissions, engine blocks, fuel tanks, fittings, valves, flanges, vehicles cabs, pump cavitations, missing gear teeth gear boxes, line blockage, steam traps, compressors, motors, pipes, flow direction, underground leaks, vacuum leaks, welds, substations, heat exchangers, seals, pump tanks, air brakes, gaskets, pressure leaks, electrical arcs, caulking, and/or junction boxes.

It will be apparent to those skilled in the art that various modifications and variations can be made to the disclosed systems and methods. For instance, systems and/or methods could be implemented using arithmetic mean, arithmetic average, or other approximation instead of the true RMS-to-DC translations described herein. In addition, combinations of the disclosed embodiments not specifically described are also possible, for example those that utilize other sensor types instead of, or in combination with, sensor types described herein. Accordingly, other embodiments will be apparent to those skilled in the art from consideration of the specification and practice of the disclosed system and methods. It is intended that the specification and examples be considered as exemplary only, with a true scope being indicated by the following claims and their equivalents.

We claim:

1. A method for graphically displaying ultrasonic energy comprising:
 receiving data from each of a plurality of ultrasonic sensors that each comprise a Root-Mean-Square-Direct Current (RMS-DC) converter, the data based on a RMS-DC calculation;
 building a contour map based on the received data;
 receiving a camera image; and
 blending at least one feature of the contour map with at least one feature of the received camera image.

2. The method of claim 1 further including smoothing the received data prior to the building.

3. The method of claim 1 further including scaling the camera image prior to the blending.

4. The method of claim 1 wherein building the contour map includes:
 initializing a matrix;
 inserting each of a plurality of known data values at positions in the matrix to create a contour map, each of the plurality of known data values associated with the RMS-DC calculation;
 scaling the contour map; and
 colorizing the contour map based on a color ramp.

5. The method of claim 4 further including:
 determining additional data values via interpolation; and
 inserting the additional data values in the contour map prior to scaling the contour map.

6. A processor-readable medium having stored thereon instructions for a method of generating a graphical user interface (GUI), the method comprising:
 receiving data from each of a plurality of ultrasonic sensors that each comprise a Root-Mean-Square-Direct Current (RMS-DC) converter, the data based on a RMS-DC calculation;
 building a contour map based on the received data;
 receiving a visual camera image;
 blending at least one feature of the contour map with at least one feature associated with the received visual camera image to create a blended image; and
 displaying the blended image in a first portion of a display screen.

7. The processor-readable medium of claim 6, the method farther including displaying the contour map in a second portion of the display screen.

8. The processor-readable medium of claim 6 wherein the at least one feature of the contour map is associated with a highest intensity on the contour map, the highest intensity related to a highest RMS-DC calculation value.

9. A method for graphically displaying ultrasonic energy comprising:
 receiving data from each of a plurality of ultrasonic sensors, the data based on Root-Mean-Square (RMS) calculation;
 building a contour map based on the received data, the building of the contour map including
  initializing a matrix,
  inserting each of a plurality of known data values at positions in the matrix to create a contour map, each of the plurality of known data values associated with a Root-Mean-Square (RMS) calculation,
  scaling the contour map, and
  colorizing the contour map based on a color ramp;
 receiving a camera image; and
 blending at least one feature of the contour map with at least one feature of the received camera image.

10. The method of claim 9 further including smoothing the received data prior to the building.

11. The method of claim 9 further including scaling the camera image prior to the blending.

12. The method of claim 9 further including:
 determining additional data values via interpolation; and
 inserting the additional data values in the contour map prior to scaling the contour map.

13. A processor-readable medium having stored thereon instructions for a method of generating a graphical user interface (GUI), the method comprising:
 receiving data from each of a plurality of ultrasonic sensors, the data based on Root-Mean-Square (RMS) calculation;
 building a contour map based on the received data, the building of the contour map including
  initializing a matrix,
  inserting each of a plurality of known data values at positions in the matrix to create a contour map, each of the plurality of known data values associated with a Root-Mean-Square (RMS) calculation,
  scaling the contour map, and
  colorizing the contour map based on a color ramp;
 receiving a visual camera image; blending at least one feature of the contour map with at least one feature associated with the received visual camera image to create a blended image; and
 displaying the blended image in a first portion of a display screen.

14. The processor-readable medium of claim 13, the method further including displaying the contour map in a second portion of the display screen.

15. The processor-readable medium of claim 13 wherein the at least one feature of the contour map is associated with a highest intensity on the contour map, the highest intensity related to a highest RMS calculation value.

* * * * *